UNITED STATES PATENT OFFICE 1,987,005

INSECTICIDE AND/OR FUNGICIDE

William A. Forbes, San Francisco, Calif.

No Drawing. Application May 26, 1931,
Serial No. 540,204

9 Claims. (Cl. 167—42)

My present invention relates to an improved carrier for poisons, repellents, insecticides, fungicides and oils in powdered form, and more particularly to a carrier in dry powdered form having highly hygroscopic characteristics in which desiccated molasses is used as a principal ingredient.

One object of my invention is to provide a carrier for powdered poisons, repellents, insecticides, fungicides and oils which will improve the distribution of such agencies in dust form.

A further object of my invention is to provide a dry carrier for the above materials which is soluble and hydroscopic, and which will dissolve and spread easily upon coming into contact with a moist surface, as when the surface to be treated is covered with dew, rain or water artificially applied.

Another object of my invention is to provide a carrier in dry powdered form which will improve the application of poisons, repellents, insecticides, fungicides and oils in powdered form and like agencies when used as a dust upon foliage and other surfaces, whether said surfaces are warm or moist.

A further object of my invention is to provide a carrier which in addition to possessing the above referred to characteristics will also act as a decoy or lure to enemies having a sense of taste and/or smell.

In the art to which my invention pertains, many types of dusting powders have been developed for the protection of crops, foliage and the like. Many of these powders contain sulphur which in the raw state is not usually wettable with water.

Therefore, a further object of my invention is to provide a carrier agency which will facilitate a wetting of the sulphur, whether used in a liquid or in a dust mixture.

My invention contemplates the use of a hygroscopic material. The material which I have found to possess the most desirable characteristics is preferably dehydrated molasses in the form of a dry powder. This material can be mixed with many compounds without fear of unfavorable reactions and since it is highly hygroscopic, it will when mixed with other ingredients and exposed to the air, readily absorb moisture. This latter feature does not interfere with its application in dust form and does render its later distribution more uniform over any surface with which it contacts, particularly where the surface is slightly moistened, and therefore produces results comparable to that of liquid sprays containing the same agencies. In fact when dehydrated molasses is used as the carrier as contemplated by my invention the mixture will be so hygroscopic that it will actually extract sufficient moisture from the atmosphere to render the dust particles sticky before they contact with the foliage or other surface to be treated. As a result of this characteristic my dusting powder will settle more rapidly as moisture is collected and when it finally engages a surface it will stick and not be blown away as is so often the case where other types of dusting powders are used. This is particularly true where the air is slightly humid or where the dust is required to travel any substantial distance through the air before contacting with the surfaces upon which it is to be applied.

While I have suggested the use of sulphur as an insecticidal and fungicidal agency, I desire to have it understood that I may use any of the powders now in general use as poisons, repellents or fungicides, such as Bordeaux, tobacco, lime, arsenic compounds, Paris green, etc.

In the application of the above referred to active ingredients with a liquid spray, it is well known that water usually constitutes about 90% of the spray, and since my improved carrier in dry form will readily absorb water, as suggested above, it will be seen that the carrier of my invention when applied to a moist surface will complete the distribution of the insecticide or other agency, and effect a considerable saving in expense and labor, and at the same time give as good a distribution and coverage as when the active ingredients are applied with water.

A suitable molasses for the purpose of my invention and one which can be cheaply had is the molasses by-product, or residue from the manufacture of beet or cane sugar, commonly called blackstrap molasses.

In addition to the above referred to molasses product I may also use residue of molasses in which yeast has been developed.

These products when dehydrated form a highly hygroscopic powder that will readily stick to any surface, particularly to a moist one, and as a result if they are combined with other functional agencies also in powdered form the desiccated products, such as molasses or other like substances, will function to retain the mixture upon any such surface with which they may contact.

In a modified form of my invention I may also add dehydrated milk to my improved carrier, the dehydrated milk in this latter instance acting as a spreading agent for the other ingredients.

One customary method of treating foliage, as in orchards and like places, is to mix the insecticidal or fungicidal agency with water and then apply it in the form of a liquid spray. This method prevents the insecticidal agency being blown away as is the case when a dusting with ordinary dry powder is attempted.

By the use of dehydrated molasses as contemplated by my invention, it is possible to dust dew wetted surfaces or sun heated surfaces in an efficient manner without the use and expense of transporting the liquid necessary to form a spray.

Another method of using my improved carrier with an insecticide for the eradication of creeping or crawling insects in orchards, is to prepare the trees by first wetting an area around the trunk of the tree and then spraying my improved carrier with or without an insecticide upon this moist surface until the surface assumes the consistency of a thick sticky mass, extending around the tree trunk. This will provide a barrier to the insects and will trap and insnare them should they attempt to cross this area.

While I have suggested the application of my improved carrier, with or without an insecticide, to the trunk of a tree or vine as the case may be it will be readily appreciated that the application of my carrier to the whole tree will be equally as effective and will ensure any insects already in the bark of the tree.

At the present time, there is considerable experimental work being done in spraying crops and foliage from aeroplanes as a means for distributing the pest control materials. These experiments have shown that the best and most convenient applications can be made when the materials are in powdered form.

My present form of carrier will be found readily applicable to this form of distribution, and in view of its moisture absorbing characteristics, it will readily settle and adhere to any surfaces with which it contacts.

On wet surfaces the dehydrated molasses will take up moisture and on hot surfaces it will melt and as a result will act as a solvent for the various powders under both conditions.

A further advantage obtained by my invention is that the same amount of active ingredients can be applied in dry form with about one-tenth of the total weight of ingredients that would be required, if applied in the form of a liquid spray.

The following is a typical example:

| Wet Bordeaux mixture | | Molasses mixture | |
|---|---|---|---|
| | *Lbs.* | | *Lbs.* |
| Bluestone | 16 | Bluestone | 16 |
| Quicklime | 20 | Quicklime | 20 |
| Water (200 gals.) | 1,600 | Milk and molasses | 128 |
| | 1,636 | | 164 |

A comparison of the above will show that the wet Bordeaux mixture containing the same amounts of bluestone and quicklime weighs ten times as much as my improved mixture containing molasses as a carrier and wetting agent.

This difference in weight is important as the problem of hauling the materials about an orchard is often difficult and sometimes impossible due to soft ground and also because of the fact that the equivalent weight of spray mixture will not cover as much area as the dry mixture.

In other words, the same weight of insecticide or fungicide in a dry mixture will cover approximately ten times as much area as an equal amount of insecticide or fungicide when applied with water in the form of a spray.

I have discovered that my dehydrated product has a very decided wetting effect upon sulphur and as a result it is possible to also apply my improved carrier with its insecticide and/or fungicide in the form of a liquid spray if desired, particularly when sulphur is used as the active ingredients.

When used with sulphur the desiccated product acts as an agent which insures a complete wetting of the sulphur.

When sulphur is to be wetted I contemplate mixing a small proportion of the desiccated product with the sulphur in powdered form.

This will provide a mixture containing sulphur that can be readily wetted by the addition of cold water and will eliminate the necessity of paying freight on the water content of the present sulphur pastes now prepared for this purpose.

It is well known that the value of sulphur as an insecticide and/or fungicide depends largely upon its oxidation and consequently when it is mixed with the extremely hygroscopic desiccated molasses, its oxidation is accelerated because of the accumulation of moisture by the molasses and as a result the effectiveness of the sulphur is greatly increased. A further advantage possessed by my carrier in combination with sulphur is that due certain constituents of the molasses other desirable chemical actions are facilitated.

In preparing my improved products, I may use varying proportions of the desiccated hygroscopic product with the other ingredients. In practice I have used as low as 10% and as much as 75% of the desiccated product with good results.

This product when mixed with other powders renders the mixture also hygroscopic and consequently when dusted upon surfaces wet artificially, or naturally with dew or rain, the several ingredients will adhere to the surfaces, the desiccated molasses forming an adhesive, and the milk products when used forming a spreading agency which will insure a very uniform distribution.

I have also discovered that my dehydrated product when mixed with oil greatly facilitates the making of emulsions with water.

By mixing oil with the dehydrated product and making a paste an emulsion can be readily formed by agitating the paste in water. This reduces the labor and expense of present methods of forming oil emulsions.

This characteristic feature of my improved carrier is considered to be an important one, as it makes possible the formation of an emulsion with a completely soluble material. In the past, so far as I am aware, all emulsions have been produced by the use of an insoluble colloid. My desiccated product is entirely free of colloidal substances and is completely soluble.

The distribution of oils in powdered form via aeroplane for the eradication of mosquitoes in swamp areas, is also made possible by preparing the proper emulsion with molasses and dehydrating the mixture to the form of a dry powder. In the distribution of such a powder by aeroplane, when the powder contacts with the water, the molasses will dissolve out and leave the oil to spread over the surface. In quiet waters, the film of oil can be replaced sufficiently often to eliminate the enemy. Mosquitoes in flight during these applications, will contact with the adhesive dust particles and be destroyed by suffocation.

The above results distinguish over the present methods in that, the oil is not submerged and carried below the surface of the water as is the case where colloids such as clay and the like is used as the emulsifying agency.

The application of an emulsion of the above type to wet foliage will also produce equally favorable results as the desiccated product will dissolve and leave the oil to perform its function.

The killing of vegetation is now accomplished by chemical applications in liquid form. Weed eradication is also accomplished chemically in cultivated crops, without injuring the crop itself by the application of an agency that is not injurious to the grain, but which will destroy the weed. For instance, wild mustard which causes serious losses in grain fields, can be eradicated by an application of iron sulfate. The iron sulfate is fatal to the mustard plant but it will not injure the growing grain in any way.

The transportation of enough liquid iron sulfate to spray the wild mustard in a large grain area besides being expensive, injures considerable grain, especially if the ground is soft. Its preparation as a dust, however, makes the above application by aeroplane possible. In some areas grain cannot be grown, due to the impossibility of controlling rust, but by dusting with the proper fungicide and my improved carrier as described here, the rust can be controlled and the growing of grain will be possible.

Vegetation can also be killed by a dust application instead of a liquid spray distribution when the proper killing agency is used with my improved product as a carrier.

In preparing a mixture for the purposes above set forth with my improved carrier I may dehydrate the molasses or other similar carrier agency separately or I may mix all the ingredients of the final mixture in solution and then reduce the mixture to powdered form by dehydration in a single operation.

This procedure can also be followed in preparing an emulsifying mixture as the oil and molasses can be mixed in solution and then dehydrated to produce a dry powder containing the desiccated molasses and oil.

While I have, for the sake of clearness and in order to disclose my invention so that the same can be readily understood, referred to specific materials and proportions, I desire to have it understood that this invention is not limited to the specific outline herein given but may be embodied in other ways that will suggest themselves, in view of this broad disclosure, to persons skilled in the art. It is believed that this invention is broadly new and it is desired to claim it as such so that all such changes as come within the scope of the appended claims are to be considered as part of this invention.

Having thus described my invention, what I claim and desire to secure by Letters Patent is:

1. A dusting powder for insecticidal and/or fungicidal purposes comprising a mixture of desiccated milk and molasses in powdered form and an active agent, said mixture being highly hygroscopic and in the form of a dry powder which will become sticky when exposed to the atmosphere.

2. A dusting powder for insecticidal and/or fungicidal purposes consisting of a desiccated mixture of molasses and an active agent, the mixture being highly hygroscopic and having the character of a dry powder which becomes sticky when exposed to moisture.

3. An insecticide and/or fungicide dusting powder consisting of an intimate mixture of desiccated molasses, desiccated milk and sulphur, the mixture being highly hygroscopic and having the character of a dry powder which will become liquid and flow in the presence of moisture.

4. A dusting product for insecticidal and/or fungicidal purposes consisting of an intimate mixture of finely divided sulphur and a desiccated solution of milk and molasses, the mixture being in the form of a highly hygroscopic powder and characterized by the fact that it will dissolve and spread freely over a wet surface.

5. An insecticide and/or fungicide product, containing as ingredients an intimate mixture of desiccated molasses and an active agent, said product being in the form of a powder and characterized by the fact that it will become adhesive upon exposure to moisture.

6. A dusting mixture for commercial purposes, having as ingredients an intimate mixture of an active insecticidal and/or fungicidal agent and desiccated molasses, the final mixture being in the form of a dry powder which becomes adhesive upon exposure to moisture.

7. A powdered hygroscopic carrier and filler for dusting insecticides and/or fungicides comprising as constituent elements desiccated milk and desiccated molasses.

8. An insecticidal and/or fungicidal dusting mixture having as ingredients an active oil and desiccated molasses, said mixture being in the form of a dry powder which becomes adhesive upon exposure to moisture.

9. An insecticidal and/or fungicidal product having as active ingredients a desiccated mixture of oil and molasses, said product being in the form of a dry powder which becomes adhesive upon exposure to moisture.

WILLIAM A. FORBES.